(12) United States Patent
Howarth et al.

(10) Patent No.: US 8,152,461 B2
(45) Date of Patent: Apr. 10, 2012

(54) INTEGRATED INLET DESIGN

(75) Inventors: Graham Howarth, Baltimore, MD (US); David P. Calder, Baltimore, MD (US)

(73) Assignee: MRA Systems, Inc., Baltimore, MD (US)

( * ) Notice: Subject to any disclaimer, the term of this patent is extended or adjusted under 35 U.S.C. 154(b) by 675 days.

(21) Appl. No.: 12/274,038

(22) Filed: Nov. 19, 2008

(65) Prior Publication Data
US 2010/0124494 A1 May 20, 2010

(51) Int. Cl.
*F01D 25/26* (2006.01)
*F01D 25/28* (2006.01)

(52) U.S. Cl. ...................... 415/213.1; 415/220

(58) Field of Classification Search ................ 415/213.1, 415/220
See application file for complete search history.

(56) References Cited

U.S. PATENT DOCUMENTS

| | | | |
|---|---|---|---|
| 3,871,844 A | 3/1975 | Calvin, Sr. | |
| 5,259,724 A * | 11/1993 | Liston et al. ..................... | 415/9 |
| 5,931,422 A | 8/1999 | Geiger et al. | |
| 6,179,249 B1 | 1/2001 | Canadas | |
| 6,231,006 B1 | 5/2001 | Gruensfelder et al. | |
| 6,260,567 B1 | 7/2001 | Gruensfelder et al. | |
| 7,793,488 B2 * | 9/2010 | Eleftheriou et al. ......... | 60/226.1 |
| 7,923,668 B2 * | 4/2011 | Layland et al. ............... | 219/535 |
| 2005/0006529 A1 | 1/2005 | Moe et al. | |
| 2005/0269443 A1 | 12/2005 | Porte | |
| 2006/0032983 A1 | 2/2006 | Brand et al. | |
| 2008/0014083 A1 * | 1/2008 | Eleftheriou et al. ....... | 415/213.1 |
| 2008/0179448 A1 * | 7/2008 | Layland et al. ............... | 244/1 N |
| 2008/0240917 A1 * | 10/2008 | Eleftheriou et al. ....... | 415/213.1 |
| 2010/0068051 A1 * | 3/2010 | Cloft et al. .................... | 415/220 |
| 2010/0084507 A1 | 4/2010 | Vauchel | |

FOREIGN PATENT DOCUMENTS

| | | |
|---|---|---|
| EP | 1084951 A2 | 3/2001 |
| EP | 1845018 A2 | 10/2007 |
| FR | 2906568 A1 | 4/2008 |

OTHER PUBLICATIONS

International Search Report issued in connection with corresponding PCT Application No. PCT/ US2009/059996 on Jun. 7, 2010.

\* cited by examiner

*Primary Examiner* — Nitin Parekh
(74) *Attorney, Agent, or Firm* — David J. Clement, Esq.; Armstrong Teasdale LLP

(57) ABSTRACT

A nacelle assembly and a method for assembling the same is provided. The nacelle assembly includes an inner barrel and an outer structure comprising a highlight and an outer aft section, wherein the highlight is defined by a forward end of the outer structure, wherein the outer aft section includes a point defined by a maximum diameter of the nacelle assembly, wherein the nacelle assembly extends at least between the highlight and the point.

20 Claims, 5 Drawing Sheets

INTEGRATED INLET DESIGN

BACKGROUND OF THE INVENTION

This invention relates generally to gas turbine engine nacelle assemblies and, more particularly, to methods and apparatus for an integrated inlet design for a nacelle assembly.

Some known nacelle assemblies used with turbine engines include a plurality of components that disrupt aerodynamic flow of the nacelle assembly with a plurality of circumferential and axial gaps and steps defined between the components. For example, at least one known nacelle assembly includes an inlet lip, an inlet outer barrel, and a fan cowl that define an outer flow surface of the nacelle assembly. Moreover, within some nacelle assemblies, some known components include a plurality of segments, which define additional gaps and steps on the outer flow surface. For example, at least one known nacelle assembly used in a large high-bypass engine includes an inlet lip defined by a plurality of radial segments.

Within some turbine engines, at least some of the components and at least some segments of the components used in the nacelle assembly are coupled in position within the nacelle assembly with a plurality of mechanical fasteners. For example, mechanical fasteners may secure a bulkhead that is positioned internal to the inlet lip. The mechanical fasteners, because of their orientation, also disrupt aerodynamic flow of the nacelle assembly. More specifically, in the bulkhead example, heads of the mechanical fasteners are exposed on the outer surface of the nacelle assembly and are positioned directly in the outer flow path. In addition to the exposed heads of the mechanical fasteners, other gaps and/or steps in the nacelle assembly may inhibit laminar flow over the outer flow surface of the nacelle assembly, and may increase aerodynamic drag. Operating a turbine engine with increased aerodynamic drag may reduce fuel burn efficiency.

BRIEF SUMMARY OF THE INVENTION

In one aspect, a method for assembling a nacelle assembly is provided. The method includes providing an outer structure that extends at least between a highlight defined by a forward end of the outer structure and a point defined by a maximum diameter of the nacelle assembly and coupling the outer structure to an inner barrel.

In another aspect, an outer structure of a nacelle assembly is provided. The outer structure includes a highlight defined by a forward end of the outer structure and an outer aft section that includes a point defined by a maximum diameter of the nacelle assembly, wherein the nacelle assembly extends at least between the highlight and the point.

In yet another aspect, a nacelle assembly is provided. The nacelle assembly includes an inner barrel and an outer structure comprising a highlight and an outer aft section, wherein the highlight is defined by a forward end of the outer structure, wherein the outer aft section includes a point defined by a maximum diameter of the nacelle assembly, wherein the nacelle assembly extends at least between the highlight and the point.

DETAILED DESCRIPTION OF THE INVENTION

The systems and methods described herein provide an exemplary integrated inlet design that defines an aerodynamic nacelle assembly design. The description should enable one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, an integrated inlet design.

Figure 1:
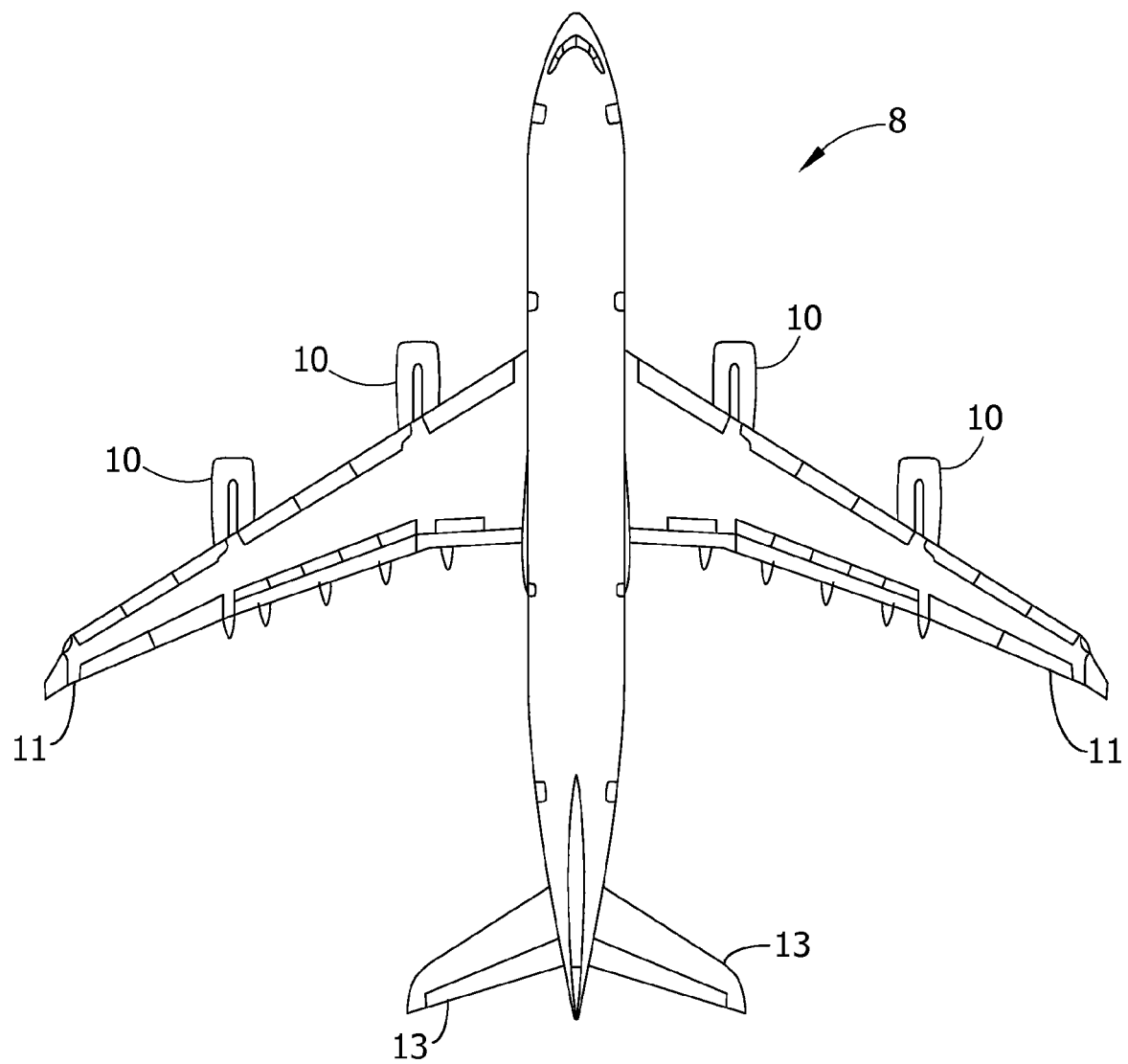
FIG. 1 is a perspective view of an exemplary aircraft.

FIG. 1 is a schematic illustration of an exemplary aircraft 8 that includes at least one turbine engine 10 used to provide thrust for aircraft 8. In the exemplary embodiment, turbine engine 10 is coupled to a wing 11. More specifically, turbine engine 10 is coupled to a wing pylon (not shown) at wing 11. In an alternate embodiment, turbine engine 10 is coupled to a tail 13. More specifically, turbine engine 10 is coupled to a fuselage (not shown) at tail 13.

Figure 2:
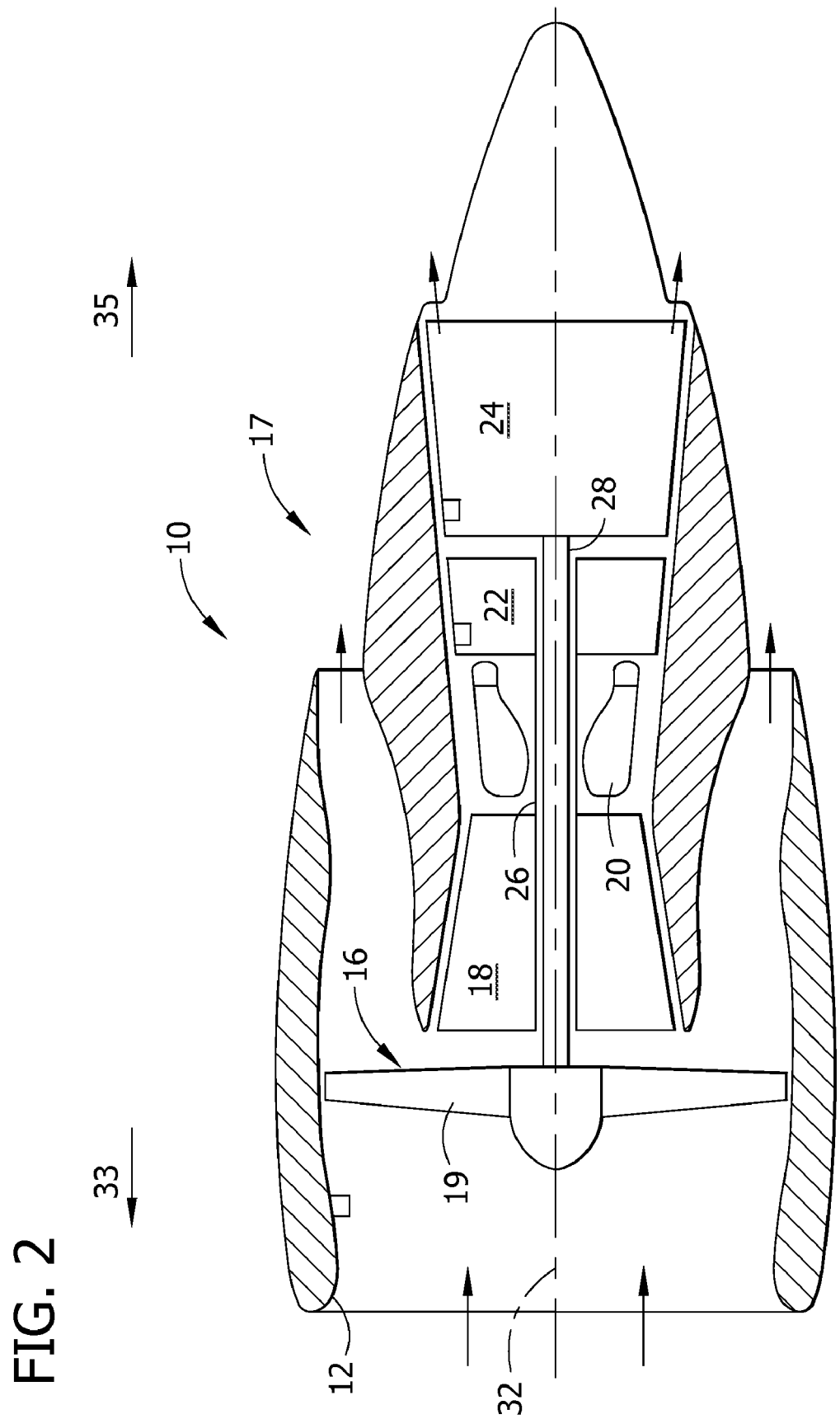
FIG. 2 is a cross-sectional view of a portion of an exemplary turbine engine that may be used with the aircraft shown in FIG. 1.

FIG. 2 is a cross-sectional view of a portion of turbine engine 10. In the exemplary embodiment, turbine engine 10 includes a fan assembly 16 that is rotatably coupled about a longitudinal centerline axis 32. In the exemplary embodiment, fan assembly 16 is positioned at a forward end 33 of turbine engine 10. In an alternative embodiment, fan assembly 16 is positioned at an aft end 35 of turbine engine 10. Fan assembly 16 includes a plurality of rows of fan blades 19 positioned within a nacelle assembly 12. In one embodiment, nacelle assembly 12 houses various operating components (not shown) of turbine engine 10.

In the exemplary embodiment, turbine engine 10 also includes a core engine 17 that is positioned downstream from fan assembly 16. Core engine 17 includes a compressor 18, a combustor 20, and a turbine 22 that is coupled to compressor 18 via a core rotor shaft 26.

During operation, core engine 17 generates combustion gases that are channeled downstream to a turbine 24 which extracts energy from the gases for powering fan assembly 16 through a shaft 28.

Figure 3:
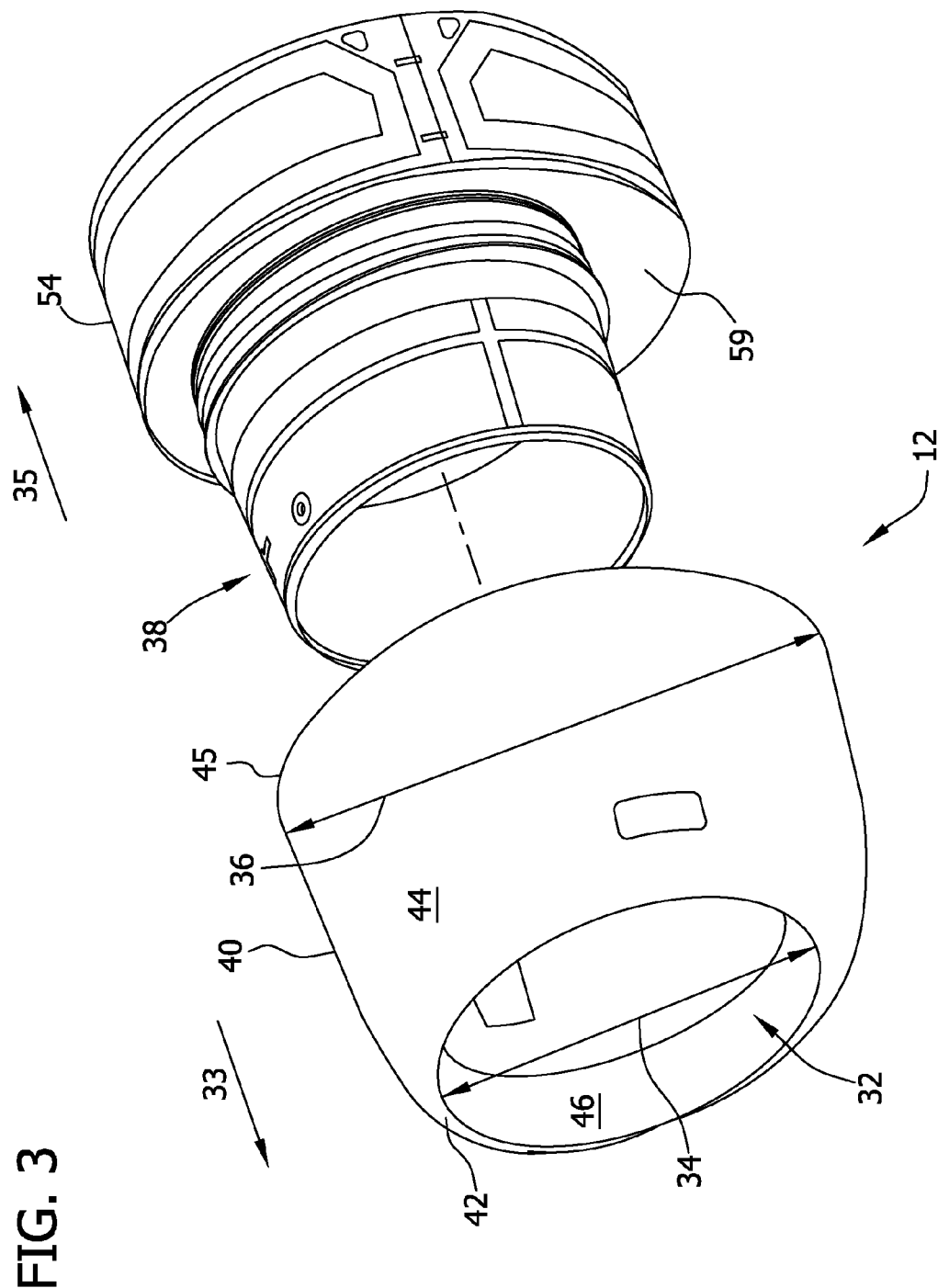
FIG. 3 is a schematic illustration of a nacelle assembly used with the turbine engine shown in FIG. 2.
Figure 4:
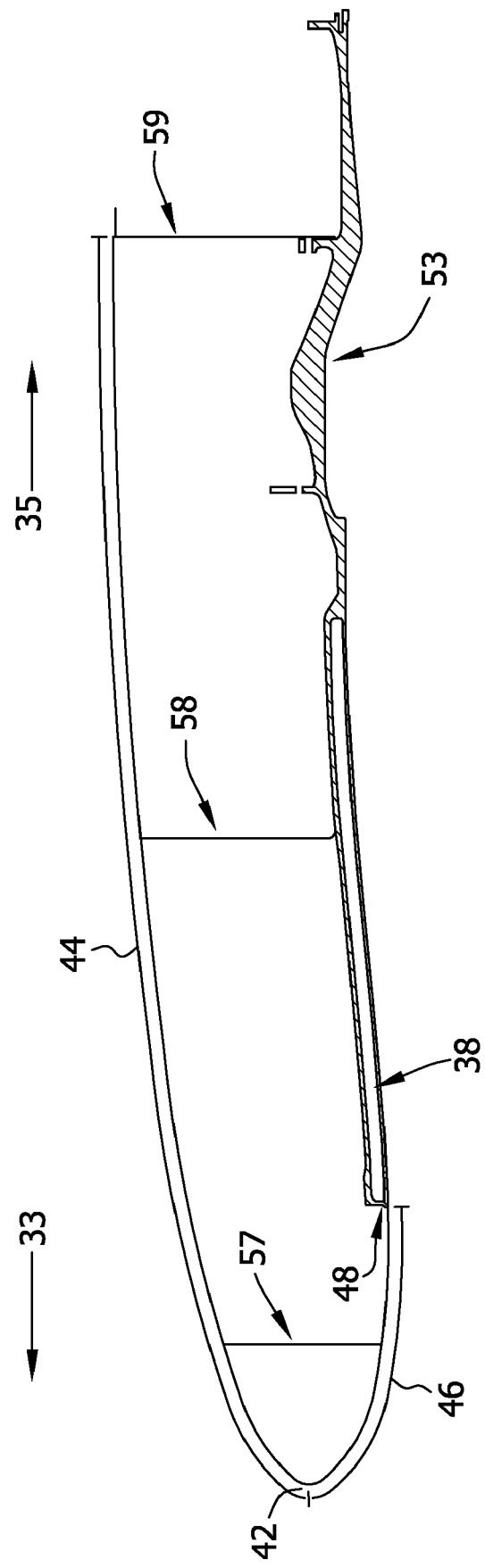
FIG. 4 is another schematic illustration of the nacelle assembly shown in FIG. 3.

FIGS. 3 and 4 are schematic illustrations of nacelle assembly 12. In the exemplary embodiment as shown in FIG. 3, nacelle assembly 12 is generally annular and defines an opening 32 sized and configured to channel air through nacelle assembly 12. Nacelle assembly 12 has a diameter 34 at forward end 33 measured with respect to an inner surface 43 that is smaller than a maximum diameter 36 of an outer surface of nacelle assembly 12.

Nacelle assembly 12 includes an inner barrel 38 and an outer structure 40. In the exemplary embodiment, outer structure 40 is fabricated from a continuous fiber reinforced thermoplastic material. Alternatively, outer structure 40 may be fabricated from a continuous fiber reinforced thermoset material. In one embodiment, outer structure 40 incorporates an integral surfacing film to facilitate protecting nacelle assembly 12 from lighting strikes.

Outer structure 40 includes a highlight 42 that is defined by forward end 33 of outer structure 40, an outer aft section 44 that is defined by highlight 42, and an inner aft section 46 that is defined by highlight 42. Outer aft section 44 includes a point 45 on an outer surface 47 defined by the maximum diameter 36 of nacelle assembly 12. In another embodiment, outer structure 40 is coupled to a hoop frame (not shown) at an aft end 35 of outer aft section 44 proximate to a fan cowl 54, such that the hoop frame facilitates coupling outer structure 40 to fan cowl 54.

In the exemplary embodiment as shown in FIG. 4, inner aft section 46 includes a first flange 48 that is used to couple outer structure 40 to inner barrel 38. In another embodiment, outer structure 40 includes a second flange 50 that is used to couple outer structure 40 to a fan case 53.

In the exemplary embodiment, nacelle assembly 12 includes a plurality of bulkheads 57, 58, and 59 that facilitate structurally supporting nacelle assembly 12. Bulkheads 57, 58, and 59 also facilitate absorbing any aftward forces induced to outer surface 47 of outer structure 40, such as may be created during a bird-strike for example. In the exemplary embodiment, bulkhead 57 is coupled to outer aft section 44 and inner aft section 46, bulkhead 58 is coupled to outer aft section 44 and inner barrel 38, and bulkhead 59 is coupled to outer aft section 44 and fan case 53. In the exemplary embodiment, bulkhead 59 is coupled to an aft end 35 of outer aft section 44 such that bulkhead 59 facilitates coupling outer structure 40 to fan cowl 54. Bulkheads 57, 58, and 59 may be coupled through a plurality of coupling processes such as through a mechanical fastening process, a thermoplastic welding process, and an adhesive bonding process.

Figure 5:
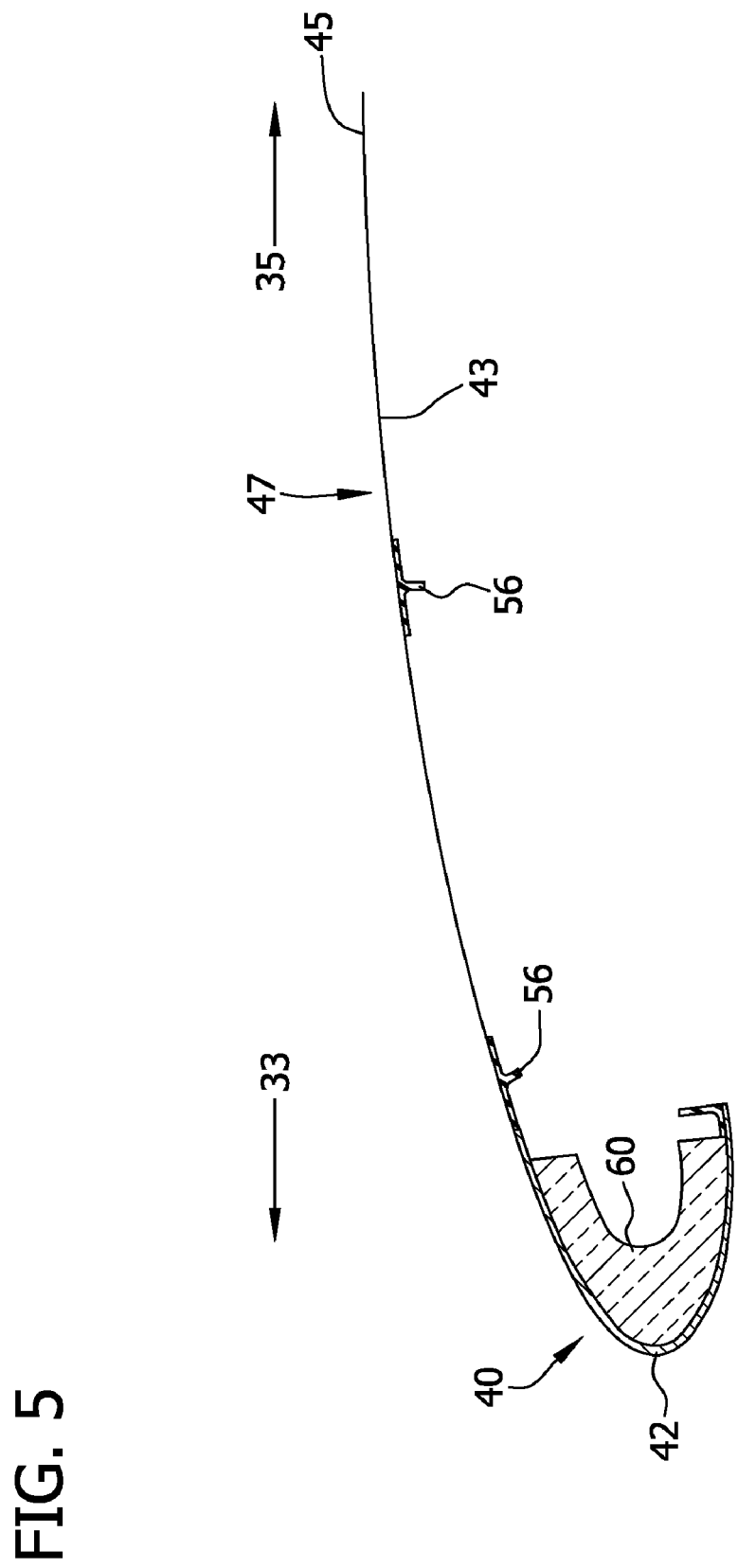
FIG. 5 is a schematic illustration of an outer structure used with the nacelle assembly shown in FIG. 3.

FIG. 5 is a schematic illustration of outer structure 40. In the exemplary embodiment, outer structure 40 includes at least one stiffener 56 that is oriented either circumferentially and/or longitudinally to facilitate structurally supporting outer aft section 44. In the exemplary embodiment, stiffener 56 is an independent component that is coupled to inner surface 43 of outer structure 40 via, for example, thermoplastic welding and/or an adhesive bonding. In an alternate embodiment, stiffener 56 may be formed integrally with outer structure 40.

In the exemplary embodiment, nacelle assembly 12 includes a structural foam 60 that is oriented and positioned to facilitate absorbing any aftward forces induced to outer surface 47 of outer structure 40, such as may be created during a bird-strike for example. In the exemplary embodiment, structural foam 60 is coupled downstream 35 from highlight 42, against inner surface 43 of outer structure 40 using at least one of a thermoplastic welding process and an adhesive bonding process.

During operation, air flows from forward end 33 to aft end 35 of nacelle assembly 12. Outer structure 40 defines an aerodynamic surface over outer surface 47 and facilitates maintaining laminar flow over outer surface 47 from highlight 42 to point 45 defined by maximum diameter 36. Outer surface 47 facilitates reducing drag and improving aerodynamics and fuel efficiency. Moreover, outer structure 40 facilitates reducing assembly time and a number of components of nacelle assembly 12 as compared to known nacelle assemblies, thereby facilitating reducing manufacturing costs and improving manufacturing cycle time. The part count reduction and the use of advanced materials, such as thermoplastic or graphite, facilitate a weight reduction for nacelle assembly 12 as compared to known nacelle assemblies.

The methods, apparatus, and systems described herein for an integrated inlet design are not limited to the specific embodiments described herein. The integrated inlet design described herein provides a more aerodynamic design that facilitates reducing drag and increasing fuel efficiency. Practice of the methods, apparatus, or systems described or illustrated herein is not limited to nacelle assemblies. Rather, the methods, apparatus, and systems described or illustrated herein may be utilized independently and separately from other components and/or steps described herein.

The written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention can be practiced with modification within the spirit and scope of the claims.

What is claimed is:

1. A method for assembling a nacelle assembly, said method comprising:
    providing an outer structure that extends at least between a highlight defined by a forward end of the outer structure and a point defined by a maximum diameter of the nacelle assembly;
    coupling a structural foam to an inner surface of an outer aft section of the outer structure; and
    coupling the outer structure to an inner barrel.

2. A method for assembling a nacelle assembly in accordance with claim 1, wherein said providing an outer structure further comprises:
    providing an outer structure that is fabricated from at least one of a continuous fiber reinforced thermoplastic material and a continuous fiber reinforced thermoset material.

3. A method for assembling a nacelle assembly in accordance with claim 1, wherein coupling the outer structure further comprises:
    coupling the outer structure to an inner barrel, wherein the outer structure includes a first flange that is positioned at an inner aft section of the outer structure, wherein the first flange is configured to couple the outer structure to the inner barrel.

4. A method for assembling a nacelle assembly in accordance with claim 1 further comprising:
    coupling the outer structure to a fan case, wherein the outer structure includes a second flange that is positioned at an inner aft section of the outer structure, wherein the second flange is configured to couple to the outer structure to the fan case.

5. A method for assembling a nacelle assembly in accordance with claim 1, wherein said providing an outer structure further comprises:
    providing an outer structure that includes a stiffener that is positioned at the inner surface of the outer aft section, wherein the stiffener is configured to structurally support the outer structure.

6. A method for assembling a nacelle assembly in accordance with claim 1 further comprising:
    providing at least one of a stiffener and a bulkhead that is configured to structurally support the outer structure; and
    coupling the at least one of the stiffener and the bulkhead to the inner surface of the outer aft section via at least one of thermoplastic welding and adhesive bonding.

7. An outer structure of a nacelle assembly, said outer structure comprising:
- a highlight defined by a forward end of said outer structure;
- an outer aft section that includes a point defined by a maximum diameter of said nacelle assembly, wherein said nacelle assembly extends at least between said highlight and said point; and
- a structural foam coupled to an inner surface of said outer aft section, said structural foam configured to structurally support said outer structure.

8. An outer structure in accordance with claim 7, wherein said outer structure is fabricated from at least one of a continuous fiber reinforced thermoplastic material and a continuous fiber reinforced thermoset material.

9. An outer structure in accordance with claim 7 further comprising a first flange that is positioned at an inner aft section of said outer structure, said first flange configured to couple said outer structure to an inner barrel.

10. An outer structure in accordance with claim 7 further comprising a second flange that is positioned at an inner aft section of said outer structure, said second flange configured to couple said outer structure to a fan case.

11. An outer structure in accordance with claim 7 further comprising a stiffener that is positioned at the inner surface of said outer aft section, wherein said stiffener is configured to structurally support said outer aft section.

12. An outer structure in accordance with claim 7 further comprising at least one of a stiffener and a bulkhead that is configured to structurally support said outer structure, wherein at least one of the stiffener and the bulkhead is coupled to the inner surface of said outer aft section via at least one of thermoplastic welding and adhesive bonding.

13. A nacelle assembly comprising:
- an inner barrel; and
- an outer structure comprising a highlight and an outer aft section, wherein said highlight is defined by a forward end of said outer structure, wherein said outer aft section includes a point defined by a maximum diameter of said nacelle assembly, wherein said nacelle assembly extends at least between said highlight and said point, and wherein a structural foam is coupled to an inner surface of said outer aft section.

14. A nacelle assembly in accordance with claim 13, wherein said outer structure is fabricated from at least one of a continuous fiber reinforced thermoplastic material and a continuous fiber reinforced thermoset material.

15. A nacelle assembly in accordance with claim 13 further comprising a first flange that is positioned at an inner aft section of said outer structure, said first flange configured to couple said outer structure to an inner barrel.

16. A nacelle assembly in accordance with claim 13 further comprising a second flange that is positioned at an inner aft section of said outer structure, said second flange configured to couple said outer structure to a fan case.

17. A nacelle assembly in accordance with claim 13, wherein said outer structure further comprises a stiffener that is positioned at the inner surface of said outer aft section, wherein said stiffener is configured to structurally support said outer aft section.

18. A nacelle assembly in accordance with claim 13 further comprising a stiffener that is configured to structurally support said outer structure, wherein the stiffener is coupled to the inner surface of said outer aft section via at least one of thermoplastic welding and adhesive bonding.

19. A nacelle assembly in accordance with claim 13 further comprising a bulkhead that is configured to structurally support said outer structure, wherein the bulkhead is coupled to the inner surface of said outer aft section via at least one of a mechanical fastening process, a thermoplastic welding process, and an adhesive bonding process.

20. A nacelle assembly in accordance with claim 13 wherein the structural foam is configured to structurally support said outer structure, and wherein the structural foam is coupled to the inner surface of said outer aft section via at least one of thermoplastic welding and adhesive bonding.

* * * * *